(12) United States Patent
Wang

(10) Patent No.: US 7,879,235 B2
(45) Date of Patent: Feb. 1, 2011

(54) METHODS FOR BIOLOGICAL PURIFICATION OF WASTE

(75) Inventor: Sijing Wang, Shanghai (CN)

(73) Assignee: General Electric Company, Schenectady, NY (US)

( * ) Notice: Subject to any disclaimer, the term of this patent is extended or adjusted under 35 U.S.C. 154(b) by 501 days.

(21) Appl. No.: 12/050,514

(22) Filed: Mar. 18, 2008

(65) Prior Publication Data

US 2009/0236282 A1    Sep. 24, 2009

(51) Int. Cl.
    *C02F 3/00*    (2006.01)
(52) U.S. Cl. ...................................... 210/601; 210/610
(58) Field of Classification Search .................. 210/601, 210/747, 610
    See application file for complete search history.

(56) References Cited

U.S. PATENT DOCUMENTS

| | | | |
|---|---|---|---|
| 4,994,391 A | 2/1991 | Hoffmann | |
| 5,427,944 A | 6/1995 | Lee et al. | |
| 5,786,188 A * | 7/1998 | Lamar et al. | ................ 435/177 |
| 5,840,182 A | 11/1998 | Lucido et al. | |
| 6,207,056 B1 | 3/2001 | Lucido et al. | |
| 6,488,852 B2 | 12/2002 | Lucido et al. | |
| 6,573,085 B2 | 6/2003 | Lucido et al. | |
| 6,599,424 B1 | 7/2003 | Teran et al. | |
| 6,878,279 B2 | 4/2005 | Davis et al. | |
| 7,022,234 B2 | 4/2006 | Shaffer et al. | |
| 7,407,590 B2 * | 8/2008 | Ludensky et al. | ........... 210/698 |
| 2004/0200773 A1 | 10/2004 | Gibbs et al. | |
| 2005/0145563 A1 | 7/2005 | Boyd et al. | |

* cited by examiner

*Primary Examiner*—Chester T Barry
(74) *Attorney, Agent, or Firm*—GE Global Patent Operation; Catherine J. Winter

(57) ABSTRACT

A method for purifying a waste environment includes treating a portion of the waste environment to inactivate or diminish native microorganisms, adding augmenting microorganisms to the treated waste environment, simultaneously growing and acclimating a microbiological culture and discharging the microbiological culture to the waste environment. The method provides improved biological purification of waste and in-situ bioaugmentation.

17 Claims, 3 Drawing Sheets

METHODS FOR BIOLOGICAL PURIFICATION OF WASTE

FIELD OF THE INVENTION

This invention relates to methods for purifying waste and more particularly, to biological methods for purifying waste.

BACKGROUND OF THE INVENTION

Wastes, under normal conditions, are gradually broken down or biodegraded by native microorganisms in the environment. However, biodegradation reactions are often hindered by environmental fluctuations such as changes in temperature, pH, salinity, water and air supply, etc. Wastes, such as wastewater and soil wastes, can be purified biologically by bioaugmentation, which is the introduction of a group of non-native microorganisms or genetically engineered variants to accelerate biodegradation of the waste and return the environment altered by contaminants to its original condition.

Some major drawbacks of bioaugmentation are that the microorganisms selected for bioaugmentation may not thrive in their new environment and will have little to no impact on the waste treatment. Short survival or lack of growth of the microorganisms can be caused by inadequately activating, acclimating and proliferating the microorganisms in the waste environment to be treated.

Prior attempts for bioaugmentation involved microbes grown or proliferated in an apparatus or a system where a major source of the nutrients is externally supplied. As a result, the augmented microbes have to be acclimated to the environment to be treated in an additional step. Insufficiently acclimated microbes will experience short survival or lack of growth in the waste treatment system.

It would be desirable to provide improved bioaugmentation methods for purifying waste.

SUMMARY OF THE INVENTION

In one embodiment, a method for purifying a waste environment comprises treating a portion of the waste environment to inactivate or diminish native microorganisms, adding augmenting microorganisms to the treated waste environment, simultaneously growing and acclimating a microbiological culture and discharging the microbiological culture to the waste environment.

The various embodiments provide improved methods for in-situ bioaugmentation having simultaneous acclimation and growth periods and reduced costs.

DETAILED DESCRIPTION OF THE INVENTION

Figure 1:
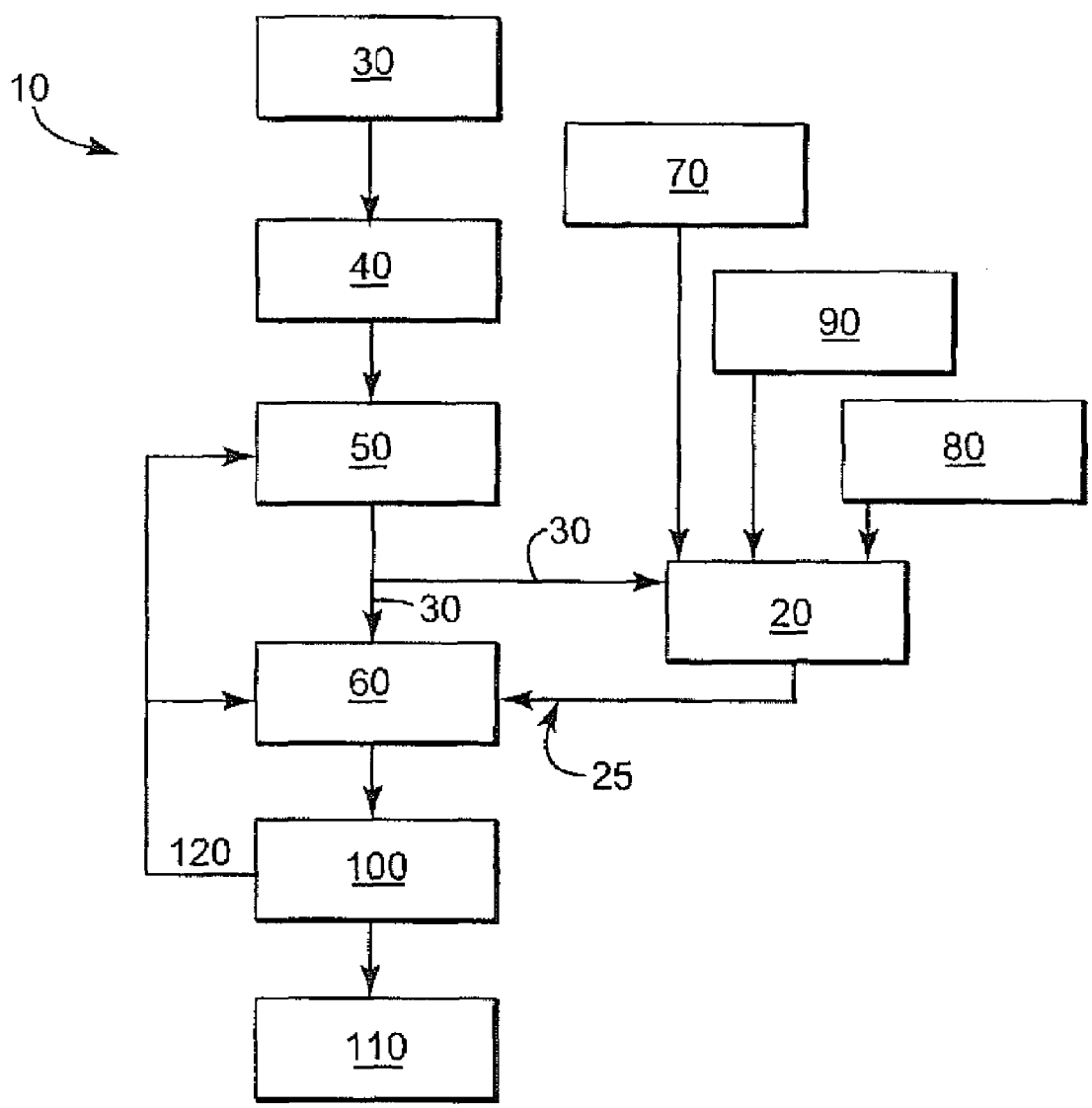
FIG. 1 is a schematic drawing depicting an exemplary embodiment of a method for purifying wastewater.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

In one embodiment, a method for purifying a waste environment comprises treating a portion of the waste environment to inactivate or diminish native microorganisms, adding augmenting microorganisms to the treated waste environment, simultaneously growing and acclimating a microbiological culture and discharging the microbiological culture to the waste environment.

The waste environment contains contaminants or wastes that need to be removed. In one embodiment, the waste environment may be industrial or municipal wastewaters or landfills, which are contaminated with undesirable compounds or pollutants, such as various organic compounds, mineral elements, nitrogen pollutants or phosphate pollutants. Under normal conditions, the contaminants are broken down or biodegraded by indigenous microorganisms in the waste environment. When the contaminants are not readily biodegradable, the biodegradation may not occur or may occur at a slower rate.

In one embodiment, the waste environment is wastewater, which may be pretreated to remove or reduce solid-waste matter. In another embodiment, the wastewater may be screened to remove coarse solids. In another embodiment, dissolved air flotation clarifiers utilizing gas entrained water may be used to remove oil, grease, fat and other types of suspended solids. In another embodiment, the wastewater may be anaerobically pretreated by using a digester apparatus, which breaks down organic and inorganic matter to a variety of end products, including methane, carbon dioxide and intermediate compounds, which are easier to be further oxidized in an aerobic biological process. The anaerobic digester uses anaerobic biological processes.

Bioaugmentation as a process for restoring the environment to normal conditions involves augmenting the environment with a proliferation of non-native microorganisms to break down the contaminants at a faster rate. The augmenting microorganisms may be any type of microorganisms suitable for biodegrading the contaminants in the waste environment; they can be anaerobic, aerobic or facultative in nature.

A portion of the waste environment is used to nourish and acclimate the microorganisms for bioaugmentation. In one embodiment, the portion of waste environment is delivered to a bioreactor. In another embodiment, the bioreactor is located on site where the waste environment is to be treated. The waste portion may be fed continuously to the bioreactor or may be fed in one or more batches.

In one embodiment, the waste environment is landfill and a portion of the landfill may be supplemented with water to aid in delivering the landfill portion to the bioreactor.

The waste environment portion is treated to remove, kill or decrease the population of any native microbes that are in the waste environment and to prevent these microbes from contaminating or interfering with the augmenting microorganisms. In one embodiment, a portion of the waste environment is treated by heating, filtering or other treatment for attenuating a growth-limiting factor or native microbial population. In another embodiment, a portion of the waste environment is treated by heating, pasteurizing, sterilizing or treating the waste environment to reduce or inactivate viable native microorganisms. In one embodiment, the waste environment is treated by heating the waste environment to at least about 50° C. In another embodiment, the waste environment is treated by heating the waste environment to a temperature in a range of from about 80° C. to about 150° C. In one embodiment, the waste environment is steam sterilized by heating the environment to a temperature of at least about 100° C. In another embodiment, the waste environment is heated for a period of time from about 10 minutes to about 1 hour.

Under constant temperature conditions, mortality of microbial populations is a logarithmic function of time:

$$\log\left(\frac{N_0}{N}\right) = \frac{t}{D}$$

wherein $N_0$ is the initial number of bacteria; N is the number of bacteria at time of exposure t; and D is the logarithmic rate constant or D-value (in minutes or hours). The D-value (in minutes) is the time required to obtain one log (tenfold reduction) in the population at a given treatment temperature.

In another embodiment, a portion of waste environment is treated by filtering the waste environment through a membrane device. The membrane is suitable for removing the native microorganisms. In one embodiment, the membrane is a microfiltration (MF) or ultrafiltration (UF) membrane. In another embodiment, the membrane has pore sizes ranging from about 0.01µ to about 10µ.

In one embodiment, a portion of the waste environment is treated in a bioreactor. In another embodiment, a portion of the waste environment is sterilized in a bioreactor. In another embodiment, a portion of the waste environment is filtered as it enters the bioreactor.

Augmenting microorganisms are added to the treated waste environment, which constitutes a major source of nutrients for the microorganisms to grow and thrive. The augmenting microorganisms may be any type of microorganism suitable for biodegrading the contaminants in the waste environment. In one embodiment, the augmenting microorganisms are anaerobic, aerobic or facultative. Examples of augmenting microorganisms include, but are not limited to, *Bacillus licheniformus, Bacillus subtilis, Pseudomonas fluorescens E., Pseudomonas putida, Enterobacter cloacae* and *Bacillus thuringeinsis.*

The augmenting microorganisms are added in an amount sufficient to grow a microbiological culture. In one embodiment, the microorganisms are added in a concentration of cells of at least about $1\times10^4$ cfu per milliliter of fluid. In another embodiment, the microorganisms are added in a cell concentration of from about $1\times10^4$ cfu per milliliter of fluid to about $1\times10^9$ cfu per milliliter of fluid. In one embodiment, the microorganisms are added to the waste environment in a bioreactor.

The microorganisms are grown and proliferated to increase the biomass density of the microorganisms and form a microbiological culture. The biomass density to be obtained depends on the amounts of cell growth substrates and nutrients in the bioreactor and how efficiently the cell growth substrates and nutrients are converted into a biomass. In one embodiment, the microorganisms are grown to a biomass density of at least 500 million cells/ml. In another embodiment, the microorganisms are grown to a biomass density in a range of from about 500 million cells/ml to about 5 billion cells/ml. In another embodiment, the microorganisms are grown to about 2.5 billion cells/ml.

In one embodiment, the microorganisms are maintained in substantially exponential growth, which is midway between a lag phase and a stationary phase. A typical growth cycle has four distinct phases in the cycle of a culture under constant condition. The four growth phases are lag, exponential, stationary and death. In the lag phase, the number of cells does not increase and the cells are preparing for active growth. Eventually, cell division begins and exponential phase growth is reached. As nutrients are exhausted or toxic metabolic products accumulate, the growth rate decreases and growth ceases.

The microorganisms may be grown in a bioreactor. Conventional biochemical engineering techniques, such as fed-batch, nutrient feeding and parameter monitoring, may be applied to grow and proliferate the microorganisms.

The microorganisms are simultaneously acclimated to the waste environment to be treated. It is not necessary to have an additional step for acclimating the microorganisms to the waste environment, as the waste environment, which is used as the major nutrient source for the microorganisms, also acclimates the microorganisms.

The major nutrient source for the microorganisms is the treated waste environment. Depending on the nutrient composition of the treated waste environment and the requirements of the augmenting microorganisms, supplemental sources of nutrients may be needed to grow and proliferate the microorganisms. Supplemental sources may include mineral elements and/or additional nitrogen, phosphorous, or carbon sources. In one embodiment, the nutrient source for the augmenting microorganisms has an optimal COD:N:P ratio (COD is Chemical Oxygen Demand) of about 100:5:1. In another embodiment, the waste environment nutrient source is supplemented to attain the COD:N:P ratio of about 100:5:1 or at other ratios where nitrogen and phosphate are present in non-limiting quantities.

The microbiological culture is discharged, injected or seeded into the waste environment to effect the bioaugmentation treatment. In one embodiment, the microorganisms are delivered while in the exponential growth phase when the microorganisms are most active.

The amount of microbiological culture that is discharged is any amount suitable for biodegrading the contaminants in the waste environment and will depend on several factors of the waste environment to be treated, such as the fluid flow rate, the organic loading, the concentration of the native microorganisms, the hydraulic retention time and the temperature. In one embodiment, the amount of microbiological culture discharged is in a cell concentration of about $1\times10^5$ cfu/ml to $5\times10^8$ cfu/ml of the fluid to be treated.

The bioaugmenting microorganisms thrive in the waste environment and immediately begin to biodegrade the waste. The bioaugmentation process is sustainable and successful, because the waste environment is used to nourish and grow the microorganisms. Using the waste environment as the major nutrient source fully acclimates the microorganisms to the waste environment and saves expenses on supplying external nutrients to the growing microorganisms. The time for preparing the microbiological culture is decreased, because acclimation occurs simultaneously with the growth of the microorganisms and a separate acclimation step is not needed.

In one embodiment, the bioreactor is situated at the site of waste treatment to provide in-situ bioaugmentation. In another embodiment, the microorganisms are grown and the waste environment is pretreated in-situ in a bioreactor located at the site of the bioaugmentation in the waste environment. Supplying microorganisms in-situ provides a quick delivery to the waste environment and minimizes any detriment, such as short survival, that may occur to the microorganisms during delivery from changing or unstable environments.

The in-situ bioaugmentation bioreactor may be any type of conventional bioreactor. In one embodiment, the in-situ bioreactor contains a tank equipped with aeration, heating, pH, dissolved oxygen and temperature monitoring devices. A mixer, such as a stirrer or paddle, may be installed in the bioreactor to increase the fluid mixing. The bioreactor has at least one inlet to receive a portion of the waste environment to be treated and a supply of augmenting microorganisms for inoculation or seeding and at least one outlet to release the incubated microorganisms. The bioreactor may be operated continuously or periodically.

FIG. 1 shows an exemplary embodiment of an industrial wastewater purification process (10) using an in situ bioaugmentation reactor (20). Industrial wastewater (30) is, optionally, pretreated (40) to remove coarse solids and suspended solids. In one embodiment, the wastewater (30) is screened to remove or reduce coarse solids with screens or bar racks. In another embodiment, the wastewater (30) is pretreated (40) with dissolved air flotation clarifiers utilizing gas-entrained water to remove oil, grease, fat and other types of suspended solids.

The industrial wastewater (30) is, optionally, anaerobically treated in an anaerobic tank (50) to digest or biodegrade pollutants. Biodegradation occurs in the absence of oxygen and involves the biological decomposition of organic and inorganic matter to a variety of end-products, including methane, carbon dioxide and intermediate compounds, which are easier to be oxidized in the aeration tank (60).

A portion of the wastewater (30) is diverted to a bioaugmentation bioreactor (20) and the remainder of the wastewater (30) is fed to an aeration tank (60). In the bioreactor (20), the wastewater (30) is treated to kill, inactivate or diminish native microorganisms to prevent the native microorganisms from contaminating the augmenting microorganism culture of the augmenting microorganisms. In one embodiment, the bioreactor (20) is heated to a temperature of at least about 50° C. and the wastewater (30) is treated within the reactor (20). After treatment, the temperature in the bioreactor (20) is reduced to a suitable temperature for growing augmenting microorganisms. In one embodiment, the temperature is reduced to a temperature of about 37° C. or below. In another embodiment, the temperature is dropped to a temperature in the range of from about 25° C. to about 37° C.

A supply of augmenting microorganisms (70) is fed into the bioreactor (20) for seeding the augmenting microorganism culture. The bioreactor (20) is aerated (80) to grow the augmenting microorganisms with a supply of air or oxygen. Supplemental nutrients (90) may be provided as needed to enhance the growth of the augmenting microorganisms. The seeded augmenting microorganisms are activated and begin to grow and proliferate in the bioreactor (20) and form a microbiological culture. Simultaneously, the augmenting microorganisms are acclimated to the wastewater (30).

The process for treating the wastewater (30) and growing the augmenting microorganisms may be run as a batch process or may be run continuously. In one embodiment, the process is run in batch mode. The wastewater is sterilized within the bioreactor (20) by heating the bioreactor (20) to the appropriate temperature and then cooling the bioreactor (20) to seed the bioreactor with the augmenting microorganisms and grow the augmenting microorganisms. In another embodiment, the process is run continuously by treating the wastewater (30) in a separate sterilization tank (not shown). The treated wastewater is then supplied to the bioreactor (20) for seeding and growing the augmenting microorganisms. The separate sterilization tank can supply the treated wastewater to the bioreactor (20) continuously or periodically.

The augmented microorganism culture (25) is then delivered to the aerobic tank (60), which also contains the remainder of the wastewater (30). The aerobic tank (60) is aerated, such as from a supply of air or oxygen, and the augmented microorganism culture begins to digest and break down organic matter and inorganic matter, such as ammonia, that is in the wastewater (30).

The aerobically treated wastewater is fed to a clarifier (100) to separate the purified wastewater (110) from the biomass or activated sludge (120) by settling. The purified wastewater (110) is removed from the top of the clarifier (100). The activated sludge (120) may be discarded or may be returned to the anaerobic tank (50) if used or to the aerobic tank (60) to replenish the biomass in these tanks.

Figure 2:
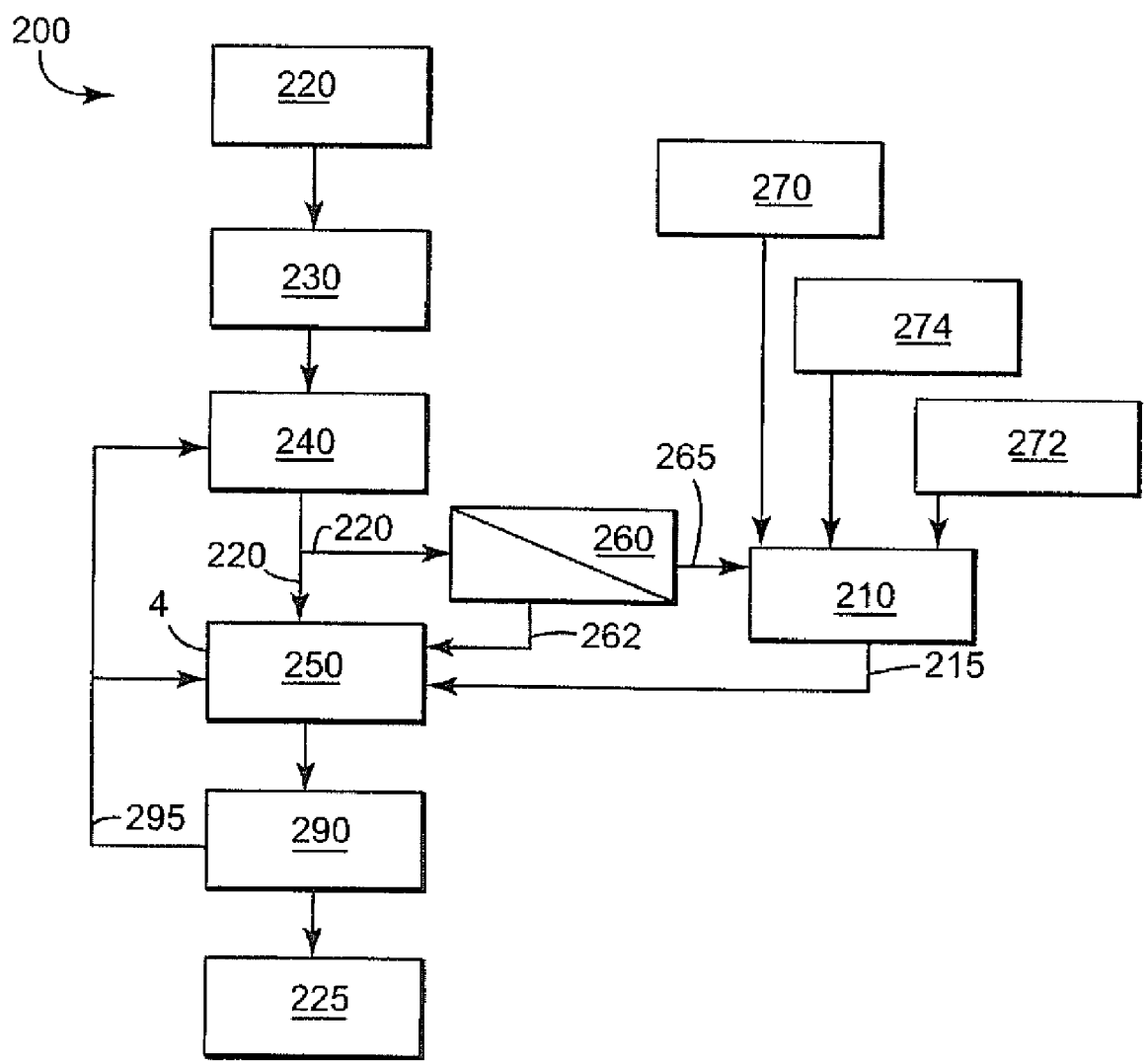
FIG. 2 is a schematic drawing depicting an exemplary embodiment of a method for purifying wastewater.

FIG. 2 shows an exemplary embodiment of an industrial wastewater purification process (200) using an in situ bioaugmentation reactor (210). Industrial wastewater (220) is, optionally, pretreated (230) to remove coarse solids and suspended solids. In one embodiment, the wastewater (220) is screened to remove or reduce coarse solids with screens or bar racks. In another embodiment, the wastewater (220) is pretreated (230) with dissolved air flotation clarifiers utilizing gas-entrained water to remove oil, grease, fat and other types of suspended solids.

The industrial wastewater (220) is, optionally, anaerobically treated in an anaerobic tank (240) to digest or biodegrade pollutants. Biodegradation occurs in the absence of oxygen and involves the biological decomposition of organic and inorganic matter to a variety of end-products, including methane, carbon dioxide and intermediate compounds, which are easier to be oxidized in the aeration tank (250).

A portion of the wastewater (220) is diverted to a bioaugmentation bioreactor (210) and the remainder of the wastewater (220) is fed to an aeration tank (250). Prior to entering the bioreactor (210), the diverted wastewater stream passes through a membrane (260) to filter out native microorganisms to prevent the native microorganisms from contaminating the augmenting microorganisms in bioreactor (210). In one embodiment, the membrane (260) is a microfiltration (MF) or ultrafiltration (UF) membrane. The filtered wastewater (265) is fed to the bioreactor (210). The residue (262) from the membrane (260) is fed to the aeration tank (250).

A supply of augmenting microorganisms (270) is fed into the bioreactor (210) for seeding the augmenting microorganism culture. The bioreactor (210) is aerated (272) to grow the augmenting microorganisms with a supply of air or oxygen. Supplemental nutrients (274) may be provided as needed to enhance the growth of the augmenting microorganisms. The seeded augmenting microorganisms are activated and begin to grow and proliferate in the bioreactor (210) and form a microbiological culture. Simultaneously, the augmenting microorganisms are acclimated to the wastewater (220). The process for treating the wastewater (220) and growing the augmenting microorganisms may be run as a batch process or may be run continuously.

The augmented microorganism culture (215) is delivered to the aerobic tank (250), which also contains the remainder of the wastewater (220). The aerobic tank (250) is aerated, such as from a supply of air or oxygen, and the augmented microorganism culture begins to digest and break down organic matter and inorganic matter, such as ammonia, that is in the wastewater (220).

The aerobically treated wastewater is fed to a clarifier (290) to separate the purified wastewater (225) from the biomass or activated sludge (295) by settling. The purified wastewater (225) is removed from the top of the clarifier (290). The activated sludge (295) may be discarded or may be returned to the anaerobic tank (240) if used or to the aerobic tank (250) to replenish the biomass in these tanks.

In order that those skilled in the art will be better able to practice the present disclosure, the following examples are given by way of illustration and not by way of limitation.

EXAMPLE

Example 1

A synthetic wastewater was prepared by mixing 25 g of Fluka® Nutrient Broth No. 1, (containing 15 g peptone, 3 g yeast extract, 6 g sodium chloride and 1 g D(+)-glucose), 500 mg phenol and 1 L water. The synthetic wastewater was steam sterilized at 121° C. for 15 minutes. 100 ml of the sterilized wastewater was poured into each of four 500 ml Erlenmeyer flasks. Flask I was inoculated with 100 mg of BioPlus® 2900 (BioPlus® 2900 is a commercial bioaugmentation product sold by GE Water and Process Technologies. It is a solid product containing a bacteria amount of about $5 \times 10^9$ cfu per 1 gram on a dry bran support). Flask II was inoculated with 300 mg of BioPlus® 2900. Flask III was inoculated with a municipal activated sludge at 0.02 g/L MLSS (mixed liquor suspended solids). Flask IV was inoculated with a municipal activated sludge at 0.04 g/L MLSS. The activated sludge used was stored in the refrigerator overnight before it was used. All four flasks were agitated at 100 rpm at 30° C. in a water bath shaker.

Figure 3:
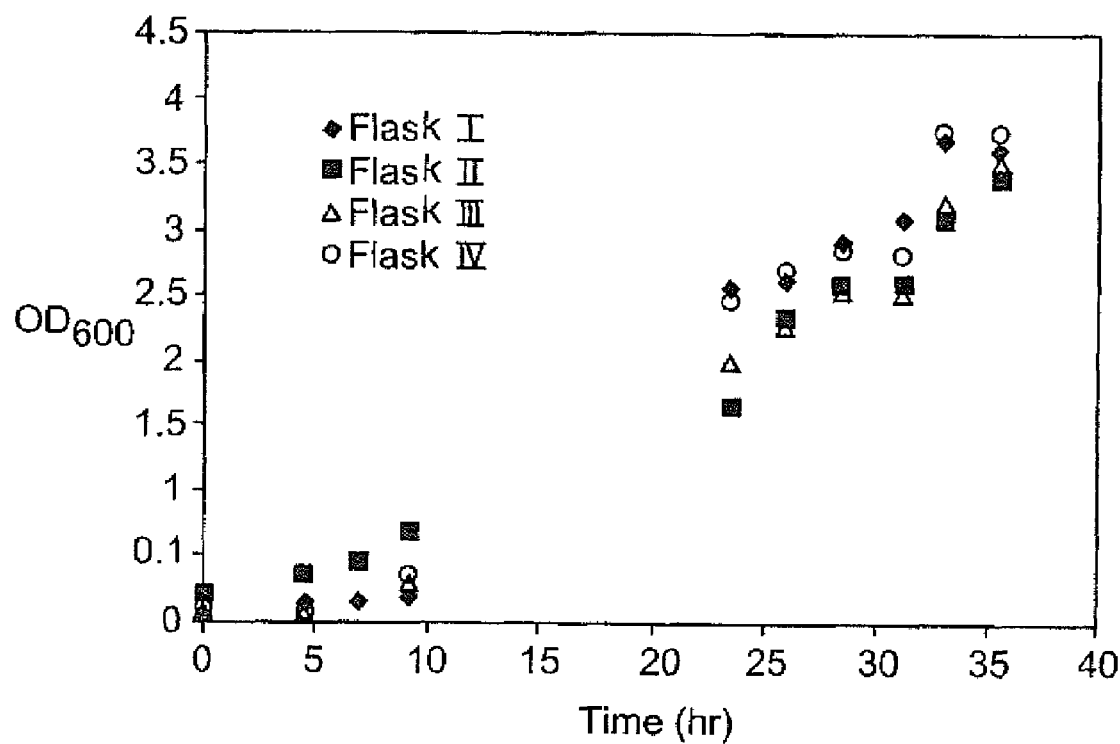
FIG. 3 is a graph showing cell growth as measured by optical density. The graph is optical density at a 600 nm wavelength versus time in hours.

A sample of the cell culture in each flask was taken and measured. A HACH® DR5000 Spectrophotometer operating at a 600 nm wavelength of light was used to determine the optical density of each sample. FIG. 3 shows the cell growth as measured by optical density versus time for each sample. Samples of each flask were taken periodically and measured as plotted in FIG. 3. Over a time period of 35 hours, no significant difference among the cell growth profiles of these four flasks was observed. Although the inoculated activated sludge concentrations in Flasks III and IV were substantially lower compared to a typical activated sludge wastewater treatment tank, which has a normal concentration in the range of 2-4 g/L MLSS, and was not in a very active environment (as it had been stored in the refrigerator overnight before inoculation), it grew at about the same rate as the seeded bioaugmenting microorganisms in Flasks I and II. FIG. 3 also shows that the inoculated augmenting microorganisms were activated, fully acclimated, and proliferated, as there was a 2-3 log (100-1000 times) increase of the bacteria quantity.

Figure 4:
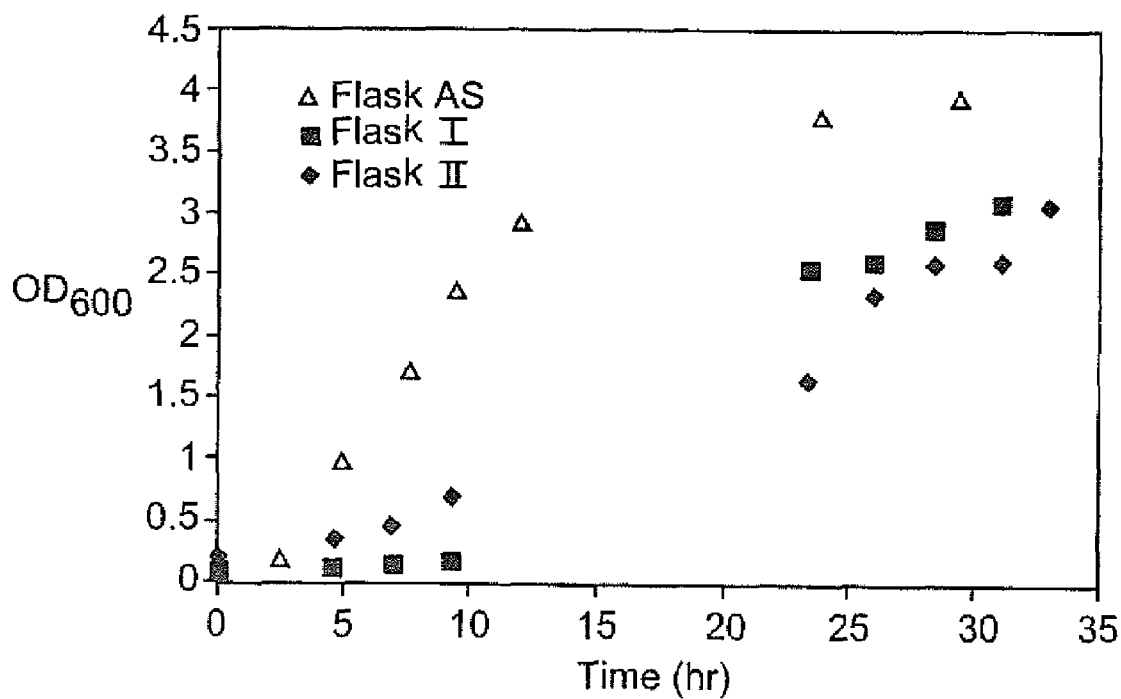
FIG. 4 is a graph showing cell growth as measured by optical density. The graph is optical density at a 600 nm wavelength versus time in hours.

1 ml of culture was taken from Flask III at 24 hours (during the exponential growth phase) and inoculated into a new 500 ml Erlenmeyer flask containing 100 ml of the sterilized synthetic wastewater (Flask AS). FIG. 4 shows the cell growth profile of samples from Flask AS. For comparison, the cell growth profiles of samples from Flasks I and II are also included in FIG. 4. The microorganisms inoculated from actively growing activated sludge grew much faster (about three times faster as calculated by the specific growth rate) during the first 10 hours compared to those inoculated with the BioPlus® product. Therefore, if the wastewater is used to activate, acclimate and proliferate bioaugmenting microorganisms without treating to eliminate or reduce the native microorganisms, the native microorganisms in the wastewater will easily out-grow and contaminate the culture of the bioaugmenting microorganisms. As a result, the nutrients of the wastewater will be consumed by the native microorganisms and the growth of the bioaugmenting microorganisms will be greatly inhibited and contaminated by the native microorganisms.

While typical embodiments have been set forth for the purpose of illustration, the foregoing descriptions should not be deemed to be a limitation on the scope herein. Accordingly, various modifications, adaptations and alternatives may occur to one skilled in the art without departing from the spirit and scope herein.

The invention claimed is:

1. A method for purifying a waste environment comprising treating a portion of the waste environment to inactivate or diminish native microorganisms, adding augmenting microorganisms to the treated waste environment, simultaneously growing and acclimating a microbiological culture and discharging the microbiological culture to the waste environment.

2. The method of claim 1 wherein the waste environment is wastewater or landfill.

3. The method of claim 1, wherein treating a portion of the waste environment comprises heating, pasteurizing, sterilizing or treating the waste environment to reduce or inactivate viable native microorganisms.

4. The method of claim 3 wherein the waste environment is heated to at least about 50° C. for a period of time from about 10 minutes to about 1 hour.

5. The method of claim 1, wherein treating a portion of the waste environment comprises filtering the waste environment through a membrane.

6. The method of claim 5, wherein the membrane comprises a microfiltration or ultrafiltration membrane.

7. The method of claim 1 wherein the augmenting microorganisms are added in a concentration of cells of at least about $1 \times 10^4$ cfu per milliliter of fluid.

8. The method of claim 1 wherein the augmenting microorganisms are grown in a bioreactor.

9. The method of claim 8 wherein the bioreactor is an in-situ bioaugmentation bioreactor located at the site of the waste environment.

10. A method of purifying wastewater comprising treating a portion of the wastewater to inactivate or diminish native microorganisms, adding augmenting microorganisms to the further treated portion of wastewater, simultaneously growing and acclimating a microbiological culture, discharging the microbiological culture to the wastewater, proliferating the microbiological culture in the waste environment to break down organic and inorganic matter in the wastewater and separating purified wastewater from the biomass.

11. The method of claim 10, wherein treating a portion of the wastewater comprises heating, pasteurizing, sterilizing or treating the wastewater to reduce or inactivate viable native microorganisms.

12. The method of claim 11 wherein the portion of wastewater is heated to at least about 50° C. for a period of time from about 10 minutes to about 1 hour.

13. The method of claim 10, wherein the portion of the wastewater is treated by filtering the wastewater through a membrane.

14. The method of claim 13, wherein the membrane comprises a microfiltration or ultrafiltration membrane.

15. The method of claim 10 wherein the augmenting microorganisms are added in a concentration of cells of at least about $1\times10^4$ cfu per milliliter of fluid.

16. The method of claim 10 wherein the augmenting microorganisms are grown in a bioreactor.

17. The method of claim 16 wherein the bioreactor is an in-situ bioaugmentation bioreactor located at the site of the wastewater.

* * * * *